United States Patent
Xu et al.

(10) Patent No.: US 11,962,007 B2
(45) Date of Patent: Apr. 16, 2024

(54) LITHIUM-ION SECONDARY BATTERY, BATTERY MODULE, BATTERY PACK, AND POWERED DEVICE

(71) Applicant: CONTEMPORARY AMPEREX TECHNOLOGY CO., LIMITED, Ningde (CN)

(72) Inventors: Liangfan Xu, Ningde (CN); Xing Li, Ningde (CN); Haizu Jin, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 18/179,650

(22) Filed: Mar. 7, 2023

(65) Prior Publication Data
US 2023/0207804 A1    Jun. 29, 2023

Related U.S. Application Data (63) Continuation of application No. PCT/CN2021/094867, filed on May 20, 2021.

(51) Int. Cl.
*H01M 4/525*   (2010.01)
*H01M 4/131*   (2010.01)
(Continued)

(52) U.S. Cl.
CPC .......... *H01M 4/525* (2013.01); *H01M 4/131* (2013.01); *H01M 4/505* (2013.01);
(Continued)

(58) Field of Classification Search
None
See application file for complete search history.

(56) References Cited

U.S. PATENT DOCUMENTS

2012/0121964 A1   5/2012  Park et al.
2017/0250386 A1*  8/2017  Pan .................... H01M 50/264
(Continued)

FOREIGN PATENT DOCUMENTS

CN    102027617 A    4/2011
CN    110148714 A    8/2019
(Continued)

OTHER PUBLICATIONS

ISR for International Application No. PCT/CN2021/094867 dated Jan. 27, 2022.
(Continued)

*Primary Examiner* — Carlos Barcena
(74) *Attorney, Agent, or Firm* — Ladas & Parry LLP (57) ABSTRACT

The disclosure relates to the field of electrochemistry, and in particular to a lithium-ion secondary battery, a battery module, a battery pack, and a powered device. A lithium-ion secondary battery, includes a bare cell accommodating cavity in which a bare cell group including one or more bare cells A and one or more bare cells B is arranged, wherein the bare cell A includes a first positive electrode sheet including a first positive-electrode active material selected from a single crystal or single crystal-like low-nickel ternary positive electrode material A1, the bare cell B includes a second positive electrode sheet including a second positive-electrode active material and/or a third positive-electrode active material, the second positive-electrode active material is selected from a polycrystalline high-nickel ternary positive electrode material B1, and the third positive-electrode active material is selected from a polycrystalline low-nickel ternary positive electrode material B2.

18 Claims, 5 Drawing Sheets

(51) Int. Cl.
  *H01M 4/505* (2010.01)
  *H01M 10/0525* (2010.01)
  *H01M 4/02* (2006.01)

(52) U.S. Cl.
  CPC .. *H01M 10/0525* (2013.01); *H01M 2004/021* (2013.01); *H01M 2004/028* (2013.01); *H01M 2220/20* (2013.01)

(56) References Cited

U.S. PATENT DOCUMENTS

2019/0393479 A1* 12/2019 Kim ................. H01M 10/0525
2020/0350583 A1  11/2020 Park et al.

FOREIGN PATENT DOCUMENTS

| | | | |
|---|---|---|---|
| CN | 110660961 | A | 1/2020 |
| CN | 112151793 | A | 12/2020 |
| CN | 112151794 | A | 12/2020 |
| WO | 2021040033 | A1 | 3/2021 |

OTHER PUBLICATIONS

Written Opinion for International Application No. PCT/CN2021/094867 dated Jan. 27, 2022.
Brian H. Toby: EXPGUI, a graphical user interface for GSAS: Journal of Applied Crystallography: 2001: 34, 210-213.
Japanese Notice of Reasons for Refusal dated May 22, 2023 for Application No. JP 2022-543600.
Extended European Search Report dated Jun. 6, 2023 for Application No. EP 21918118.
Kaneda, Haruki et al., "Single-Crystal-Like Durable LiNiO2 Positive Electrode Materials for Lithium-Ion Batteries", ACS Appl. Mater. Interfaces 2022, 14, 47, pp. 52766-52778, Nov. 16, 2022.
"UC Irvine team creates long-lasting, cobalt-free, low-nickel lithium-ion batteries", Jun. 16, 2023 (https:// www.green carcongress.com/2023/06/20230616-uce.html).
"Competitive technologies to high nickel Li-ion batteries—The pros and cons", Nickel Institute, Feb. 21, 2020.

* cited by examiner

LITHIUM-ION SECONDARY BATTERY, BATTERY MODULE, BATTERY PACK, AND POWERED DEVICE

CROSS-REFERENCE TO RELATED APPLICATIONS

This application is a continuation of PCT/CN2021/094867 filed May 20, 2021, which is incorporated herein by reference in its entirety.

TECHNICAL FIELD

The present invention relates to the field of electrochemistry, and in particular to a lithium-ion secondary battery, a battery module, a battery pack, and a powered device.

BACKGROUND ART

A lithium-ion secondary battery mainly relies on the back-and-forth migration of lithium ions between a positive-electrode active material and a negative-electrode active material for charging and discharging. The lithium-ion secondary battery can provide stable voltage and current in the process of use, and the use process of it is green and environmentally friendly, so it is widely applied in various electrical equipment, such as mobile phones, tablet computers, laptops, electric bicycles, electric vehicles, etc.

For a lithium-ion battery with high energy density and high voltage, there is a continuous need to improve its overall performance. In the prior art, there is a structure employing sublayers of a variety of different positive-electrode active materials, in which the positive-electrode active material of one sublayer uses a ternary positive electrode material with a single crystal or single crystal-like structure, and another sublayer uses a ternary positive electrode material with a single crystal or single crystal-like structure mixed with a polycrystalline structure, but similar improvements only take layers of electrode sheets into consideration, and the improvement of the comprehensive performance of the battery is still limited.

SUMMARY OF THE INVENTION

In view of the afore-mentioned shortcomings of the prior art, an objective of the present invention is to provide a lithium-ion secondary battery, so as to further improve the comprehensive performance of the lithium-ion secondary battery, such as high energy density, cycling performance, storage performance, gas production performance and safety performance.

In order to achieve the afore-mentioned objective and other related objectives, the present invention provides a lithium-ion secondary battery, which includes a bare cell accommodating cavity in which a bare cell group including one or more bare cells A and one or more bare cells B is arranged, wherein the bare cell A includes a first positive electrode sheet including a first positive-electrode active material selected from a single crystal or single crystal-like low-nickel ternary positive electrode material A1, the bare cell B includes a second positive electrode sheet including a second positive-electrode active material and/or a third positive-electrode active material, the second positive-electrode active material is selected from a polycrystalline high-nickel ternary positive electrode material B1, and the third positive-electrode active material is selected from a polycrystalline low-nickel ternary positive electrode material B2. By mixing positive electrodes of the bare cells including the single crystal or single crystal-like low-nickel ternary positive electrode material and the polycrystalline high-nickel ternary positive electrode material respectively, it is possible to make better use of the relatively more obvious crystal lattice shrinkage property of the polycrystalline high-nickel ternary positive electrode material under a high SOC (state of charge) delithiation state to improve cyclic diving, so as to improve the comprehensive performance of the lithium-ion secondary battery, such as high energy density, cycling performance, storage performance, gas production performance and safety performance.

In any embodiment, the molecular formula of the single crystal or single crystal-like low-nickel ternary positive electrode material A1 is $LiNi_{x1}Co_{y1}Mn_{1-x1-y1}O_2$, wherein $0<x1\leq0.65$, $0<y1<0.35$, $0<1-x1-y1<0.35$; or the molecular formula of the single crystal or single crystal-like low-nickel ternary positive electrode material A1 is $LiNi_{x1}Co_{y1}Mn_{1-x1-y1}O_2$, wherein $0<x1\leq0.55$, $0<y1<0.45$, $0<1-x1-y1<0.45$. Therefore, the single crystal or single crystal-like ternary positive electrode material with a lower nickel content in the bare cell A can cooperate with the polycrystalline ternary positive electrode material with a higher nickel content in the bare cell B to improve the comprehensive performance of the lithium-ion secondary battery.

In any embodiment, the molecular formula of the polycrystalline high-nickel ternary positive electrode material B1 is $LiNi_{x2}Co_{y2}Mn_{1-x2-y2}O_2$, wherein $0.7\leq x2<1$, $0<y2<0.3$, $0<1-x2-y2<0.3$; or the molecular formula of the polycrystalline high-nickel ternary positive electrode material B1 is $LiNi_{x2}Co_{y2}Mn_{1-x2-y2}O_2$, wherein $0.7\leq x2\leq0.8$, $0.2<y2<0.3$, $0.2<1-x2-y2<0.3$. Therefore, the polycrystalline ternary positive electrode material with a higher nickel content is introduced into the bare cell B, so as to cooperate with the single crystal or single crystal-like ternary positive electrode material with a lower nickel content in the bare cell A to improve the comprehensive performance of the lithium-ion secondary battery.

In any embodiment, the molecular formula of the polycrystalline low-nickel ternary positive electrode material B2 is $LiNi_{x3}Co_{y3}Mn_{1-x3-y3}O_2$, wherein $0<x3\leq0.65$, $0<y3<0.35$, $0<1-x3-y3<0.35$; or the molecular formula of the polycrystalline low-nickel ternary positive electrode material B2 is $LiNi_{x3}Co_{y3}Mn_{1-x3-y3}O_2$, wherein $0<x3\leq0.55$, $0<y3<0.45$, $0<1-x3-y3<0.45$. Therefore, the polycrystalline ternary positive electrode material with a lower nickel content can be introduced into the bare cell B. Although the introduction of this material may lead to relative deterioration of the gas production performance, it can improve the comprehensive performance of the lithium-ion secondary battery as a whole.

In any embodiment, the 100% SOC charged unit cell volume shrinkage rate of the single crystal or single crystal-like low-nickel ternary positive electrode material A1 is $\leq 3\%$; and/or, the 100% SOC charged unit cell volume shrinkage rate of the polycrystalline high-nickel ternary positive electrode material B1 is $\geq 4\%$; and/or, the 100% SOC charged unit cell volume shrinkage rate of the polycrystalline low-nickel ternary positive electrode material B2 is $\leq 3\%$. Therefore, through the selection of the 100% SOC charged unit cell volume shrinkage rate, the lattice shrinkage property of the ternary positive electrode material at high SOC can be better reflected.

In any embodiment, the bare cell B is distributed closer to the outside of the bare cell group than the bare cell A. Therefore, the bare cell B is placed more outside the bare cell group, which is similar to providing a buffer layer to buffer the bare cell A, and thus can effectively avoid an expansion problem caused by an obvious trend of increase in the expansion force of the bare cell during a charging process.

In any embodiment, the bare cell A is distributed closer to the middle of the bare cell group than the bare cell B. This is because the temperature rise of the bare cell in the middle area of the cell is generally more obvious, which is more conducive to the infiltration of electrolyte solution. Distributing the bare cell A in the middle of the bare cell group can further avoid large-area lithium plating of the bare cell A due to reasons such as large expansion force and insufficient infiltration of electrolyte solution in the middle area.

In any embodiment, the second positive electrode sheet further includes a fourth positive-electrode active material selected from a single crystal or single crystal-like low-nickel ternary positive electrode material A2, and the molecular formula of the single crystal or single crystal-like low-nickel ternary positive electrode material A2 is $LiNi_{x4}Co_{y4}Mn_{1-x4-y4}O_2$, wherein $0<x4\leq0.65$, $0<y4<0.35$, $0<1-x4-y4<0.35$; or the second positive electrode sheet further includes a fourth positive-electrode active material selected from a single crystal or single crystal-like low-nickel ternary positive electrode material A2, and the molecular formula of the single crystal or single crystal-like low-nickel ternary positive electrode material A2 is $LiNi_{x4}Co_{y4}Mn_{1-x4-y4}O_2$, wherein $0<x4\leq0.55$, $0<y4<0.45$, $0<1-x4-y4<0.45$. Therefore, the single crystal or single crystal-like ternary positive electrode material with a lower nickel content in the afore-mentioned numerical range has better gas production performance, which can cooperate with the ternary positive electrode material with a higher nickel content in the bare cell B to improve the comprehensive performance of the lithium-ion secondary battery.

In any embodiment, the 100% SOC charged unit cell volume shrinkage rate of the single crystal or single crystal-like low-nickel ternary positive electrode material A2 is $\leq3\%$. Through the selection of the 100% SOC charged unit cell volume shrinkage rate, the lattice shrinkage property of the ternary positive electrode material at high SOC can be better reflected.

In any embodiment, in the lithium-ion secondary battery, a mass ratio k of the total mass of the single crystal positive-electrode active material to the total mass of the polycrystalline positive-electrode active material is 0.5-9. Therefore, it enables the lithium-ion secondary battery as a whole to have better comprehensive performance.

In any embodiment, the coating amount of a negative electrode in the bare cell A is $\leq0.150$ g/1540.25 mm^2. Therefore, the coating amount of the negative electrode of the bare cell A is within the afore-mentioned range, which can be more conducive to improving the kinetics of the negative electrode, and avoiding large-area lithium plating of the bare cell A with obvious expansion growth due to excessive expansion growth and insufficient infiltration of electrolyte solution.

A second aspect of the present application provides a battery module including the lithium-ion secondary battery of the first aspect of the present application.

A third aspect of the present application provides a battery pack including the battery module of the second aspect of the present application.

A fourth aspect of the present application provides a powered device including one or more selected from the lithium-ion secondary battery of the second aspect of the present application, the battery module of the third aspect of the present application, or the battery pack of the fifth aspect of the present application.

As compared with the prior art, the present invention has the following beneficial effects:

The lithium-ion battery provided by the present invention includes the single crystal or single crystal-like low-nickel ternary positive electrode material and the polycrystalline high-nickel ternary positive electrode material respectively located in different bare cells. By mixing the bare cells with different positive electrode systems, it is possible to better optimize the use proportion of the single crystal low-nickel positive-electrode active material to the polycrystalline high-nickel positive-electrode active material in the whole battery, so as to obtain a lithium-ion secondary battery with excellent cycle, storage, gas production, and safety performance under high energy density and high state of charge.

DESCRIPTION OF REFERENCE NUMERALS

1 battery pack
2 upper box
3 lower box
4 battery module
5 lithium-ion secondary battery
51 case
52 electrode assembly
53 top cover assembly

DETAILED DESCRIPTION

In order to make the invention objective, technical solution and beneficial technical effects of the present invention clearer, the present invention will be further explained in detail with examples below, and other advantages and effects of the present invention can be easily understood by those skilled in the art from the disclosure of this specification.

For the sake of brevity, the present application only explicitly discloses some numerical ranges. However, any lower limit can be combined with any upper limit to form an unspecified range, and any lower limit can be combined with other lower limits to form an unspecified range, and likewise, any upper limit can be combined with any other upper limit to form an unspecified range. Furthermore, every point or single numerical value between the endpoints of a range is included within the range, even if not expressly recited. Thus, each point or single numerical value may serve as its own lower or upper limit to form an unspecified range in combination with any other point or single numerical value or with other lower or upper limits.

In the description herein, it should be noted that, "above" and "below" are inclusive of the numerical numeral itself, and the meaning of "more" in "one or more" is more than two, unless otherwise specified.

The afore-mentioned summary of the present invention is not intended to describe each disclosed embodiment or every implementation of the present invention. The following description illustrates exemplary embodiments more specifically. In various places throughout the present application, guidance is provided through a series of embodiments, which embodiments can be used in various combinations. In various embodiments, the enumeration is merely a representative group, and should not be construed as exhaustive.

Lithium-Ion Secondary Battery

In an embodiment of the present application, the present invention provides a lithium-ion secondary battery, which includes a bare cell accommodating cavity in which a bare cell group including one or more bare cells A and one or more bare cells B is arranged, wherein the bare cell A includes a first positive electrode sheet including a first positive-electrode active material selected from a single crystal or single crystal-like low-nickel ternary positive electrode material A1, the bare cell B includes a second positive electrode sheet including a second positive-electrode active material and/or a third positive-electrode active material, the second positive-electrode active material is selected from a polycrystalline high-nickel ternary positive electrode material B1, and the third positive-electrode active material is selected from a polycrystalline low-nickel ternary positive electrode material B2. Compared with the single crystal or single crystal-like low-nickel ternary positive electrode material, the polycrystalline high-nickel ternary positive electrode material has a more obvious lattice shrinkage effect at high SOC (e.g., ≥65% SOC, ≥64% SOC, ≥63% SOC, ≥62% SOC, ≥61% SOC, ≥60% SOC, ≥59% SOC, ≥58% SOC, ≥57% SOC, ≥56% SOC, or ≥55% SOC), which can effectively alleviate the impact on the stress of the negative electrode during the charging process, and reduce the risk of lithium plating of the negative electrode due to large expansion force and cyclic diving due to the lithium plating. However, at high SOC, the polycrystalline high-nickel ternary positive electrode material has the risk of gas production deterioration and reduced safety performance, as well as significantly deteriorated storage compared with the single crystal low-nickel material. However, the inventor of the present application has unexpectedly found that, as compared with the physical mixing of single crystal and polycrystal in a single bare cell or a double-layer design of single crystal or polycrystal in a single bare cell, by mixing positive electrodes of the bare cells including the single crystal or single crystal-like low-nickel ternary positive electrode material and the polycrystalline high-nickel ternary positive electrode material respectively, it is possible to make better use of the relatively more obvious crystal lattice shrinkage property of the polycrystalline high-nickel ternary positive electrode material under a high SOC delithiation state to improve cyclic diving, thereby effectively improving the comprehensive performance (e.g., cyclic service life, etc.) of the lithium-ion secondary battery.

In the present application, a ternary positive electrode material with a single crystal structure usually refers to a ternary positive electrode material with primary particles and no occurrence of obvious agglomeration (the volume distribution ratio of secondary particles formed by a very small amount of agglomeration is <5%). The volumetric average particle size ($D_{v50}$) of the primary particles of the ternary positive electrode material with the single crystal structure can generally be 1-10 μm, 1-2 μm, 2-3 μm, 3-4 μm, 4-5 μm, 5-6 μm, 6-7 μm, 7-8 μm, 8-9 μm, or 9-10 μm. For example, the ternary positive electrode material with the single crystal structure can be $LiNi_{0.55}Co_{0.15}Mn_{0.30}O_2$, $LiNi_{0.55}Co_{0.05}Mn_{0.40}O_2$, $LiNi_{0.65}Co_{0.07}Mn_{0.28}O_2$ etc. A ternary positive electrode material with a single crystal-like structure usually refers to a ternary positive electrode material in which primary particles are slightly agglomerated (the volume distribution ratio of the secondary particles formed by agglomeration accounts for 10%-35%). For example, the ternary positive electrode material with the single crystal-like structure may be $LiNi_{0.56}Co_{0.12}Mn_{0.32}O_2$, etc. The ternary positive electrode material with the polycrystalline structure refers to the formation of secondary spherical particles by agglomeration of primary particles. For example, the ternary positive electrode material with the polycrystalline structure having relatively higher nickel content may be $LiNi_{0.70}Co_{0.10}Mn_{0.20}O_2$, $LiNi_{0.80}Co_{0.10}Mn_{0.10}O_2$, etc. Also for example, the ternary positive electrode material with the polycrystalline structure having relatively lower nickel content may be $LiNi_{0.56}Co_{012}Mn_{0.32}O_2$, etc.

In some embodiments, the positive-electrode active material included in the bare cell A may mainly include a first positive-electrode active material which may generally be a single crystal or single crystal-like low-nickel ternary positive electrode material A1, of which the molecular formula may be $LiNi_{x1}Co_{y1}Mn_{1-x1-y1}O_2$. x1 can generally satisfy $0<x1\leq0.65$, $0<x1\leq0.05$, $0.05\leq x1\leq0.1$, $0.1\leq x1\leq0.15$, $0.15\leq x1\leq0.2$, $0.2\leq x1\leq0.25$, $0.25\leq x1\leq0.3$, $0.3\leq x1\leq0.35$, $0.35\leq x1\leq0.4$, $0.4\leq x1\leq0.45$, $0.45\leq x1\leq0.5$, $0.5\leq x1\leq0.55$, $0.55\leq x1\leq0.6$, or $0.6\leq x1\leq0.65$, and preferably can satisfy $0<x1\leq0.55$. y1 can generally satisfy $0<y1<0.45$, $0<y1\leq0.05$, $0.05\leq y1\leq0.1$, $0.1\leq y1\leq0.15$, $0.15\leq y1\leq0.2$, $0.2\leq y1\leq0.25$, $0.25\leq y1\leq0.3$, $0.3\leq y1<0.35$, $0.35\leq y1<0.4$, or $0.4\leq y1<0.45$. Generally speaking, the preferred value range of y1 corresponds to the preferred value range of x1. When x1 can satisfy $0<x1\leq0.55$, y1 can generally satisfy $0<y1<0.45$. 1−x1−y1 can generally satisfy $0<1-x1-y1<0.45$, $0<1-x1-y1\leq0.05$, $0.05\leq 1-x1-y1\leq0.1$, $0.1\leq 1-x1-y1\leq0.15$, $0.15\leq 1-x1-y1\leq0.2$, $0.2\leq 1-x1-y1\leq0.25$, $0.25\leq 1-x1-y1\leq0.3$, $0.3\leq 1-x1-y1<0.35$, $0.35\leq 1-x1-y1<0.4$, or $0.4\leq 1-x1-y1<0.45$. Generally speaking, the preferred value range of 1−x1−y1 corresponds to the preferred value range of x1. When x1 can satisfy $0<x1\leq0.55$, 1−x1−y1 can generally satisfy $0<1-x1-y1<0.45$. The lattice shrinkage property of the ternary positive electrode material at high SOC can be reflected by the nickel content in the material. Generally speaking, the single crystal or single crystal-like ternary positive electrode material with a relatively lower nickel content has relatively non-obvious lattice shrinkage effect, but has better gas production performance. The single crystal or single crystal-like ternary positive electrode material with a relatively lower nickel content in the bare cell A can cooperate with the polycrystalline ternary positive electrode material with a relatively higher nickel content in the bare cell B to improve the comprehensive performance of the lithium-ion secondary battery.

In some embodiments, the 100% SOC charged unit cell volume shrinkage rate of the single crystal or single crystal-like low-nickel ternary positive electrode material A1 is generally ≤3%, and the specific measurement method of the 100% SOC charged unit cell volume shrinkage rate can refer to the measurement method given in the examples of the present invention. Through the selection of the 100% SOC charged unit cell volume shrinkage rate, the lattice shrinkage property of the ternary positive electrode material at high SOC can be reflected more accurately.

In some embodiments, the positive-electrode active material included in the bare B may include a second positive-electrode active material which may generally be a polycrystalline high-nickel ternary positive electrode material B1, of which the molecular formula may be $LiNi_{x2}Co_{y2}Mn_{1-x2-y2}O_2$. x2 can generally satisfy $0.7≤x2<1$, $0.7≤x2≤0.75$, $0.75≤x2≤0.8$, $0.8≤x2≤0.85$, $0.85≤x2≤0.9$, $0.9≤x2≤0.95$, $0.95≤x2<1$, and preferably can satisfy $0.7≤x2≤0.8$. y2 can generally satisfy $0<y2<0.3$, $0<y2≤0.05$, $0.05≤y2≤0.1$, $0.1≤y2≤0.15$, $0.15≤y2≤0.2$, $0.2≤y2≤0.25$, or $0.25≤y2<0.3$. Generally speaking, the preferred value range of y2 corresponds to the preferred value range of x2. When x2 can satisfy $0.7≤x2≤0.8$, y2 can generally satisfy $0.2<y2<0.3$. 1−x2−y2 can generally satisfy $0≤1-x2-y2≤0.3$, $0≤1-x2-y2≤0.05$, $0.05≤1-x2-y2≤0.1$, $0.1≤1-x2-y2≤0.15$, $0.15≤1-x2-y2≤0.2$, $0.2≤1-x2-y2≤0.25$, or $0.25≤1-x2-y2≤0.3$. Generally speaking, the preferred value range of 1−x2−y2 corresponds to the preferred value range of x2. When x2 can satisfy $0.7≤x2≤0.8$, 1−x2−y2 can generally satisfy $0.2<1-x2-y2<0.3$. The lattice shrinkage property of the ternary positive electrode material at high SOC can be reflected by the nickel content in the material. Generally speaking, the polycrystalline ternary positive electrode material with a relatively higher nickel content has relatively more obvious lattice shrinkage effect, but has relatively worse gas production performance. The polycrystalline ternary positive electrode material with a relatively higher nickel content introduced into the bare cell B can cooperate with the single crystal or single crystal-like ternary positive electrode material with a relatively lower nickel content in the bare cell A to improve the comprehensive performance of the lithium-ion secondary battery.

In some embodiments, the 100% SOC charged unit cell volume shrinkage rate of the polycrystalline high-nickel ternary positive electrode material B1 is generally ≥4%. Through the selection of the 100% SOC charged unit cell volume shrinkage rate, the lattice shrinkage property of the ternary positive electrode material at high SOC can be reflected more accurately.

In some embodiments, the positive-electrode active material included in the bare cell B may include a third positive-electrode active material which may generally be a polycrystalline low-nickel ternary positive electrode material B2, of which the molecular formula may be $LiNi_{x3}Co_{y3}Mn_{1-x3-y3}O_2$. x3 can generally satisfy $0<x3≤0.65$, $0<x3≤0.05$, $0.05≤x3≤0.1$, $0.1≤x3≤0.15$, $0.15≤x3≤0.2$, $0.2≤x3≤0.25$, $0.25≤x3≤0.3$, $0.3≤x3≤0.35$, $0.35≤x3≤0.4$, $0.4≤x3≤0.45$, $0.45≤x3≤0.5$, $0.5≤x3≤0.0.55$, $0.55≤x3≤0.6$, or $0.6≤x3≤0.65$, and preferably can satisfy $0<x3≤0.55$. y3 can generally satisfy $0<y3≤0.45$, $0<y3≤0.05$, $0.05≤y3≤0.1$, $0.1≤y3≤0.15$, $0.15≤y3≤0.2$, $0.2≤y3≤0.25$, $0.25≤y3≤0.3$, $0.3≤y3≤0.35$, $0.35≤y3<0.4$, or $0.4≤y3<0.45$. Generally speaking, the preferred value range of y3 corresponds to the preferred value range of x3. When x3 can satisfy $0<x3≤0.55$, y3 can generally satisfy $0<y3<0.45$. 1−x3−y3 can generally satisfy $0<1-x3-y3<0.45$, $0<1-x3-y3<0.05$, $0.05≤1-x3-y3≤0.1$, $0.1≤1-x3-y3≤0.15$, $0.15≤1-x3-y3≤0.2$, $0.2≤1-x3-y3≤0.25$, $0.25≤1-x3-y3≤0.3$, $0.3≤1-x3-y3<0.35$, $0.35≤1-x3-y3<0.4$, or $0.4≤1-x3-y3<0.45$. Generally speaking, the preferred value range of 1−x3−y3 corresponds to the preferred value range of x3. When x3 can satisfy $0<x3≤0.55$, 1−x3−y3 can generally satisfy $0<1-x3-y3<0.45$. A polycrystalline ternary positive electrode material with a lower nickel content can be introduced into the bare cell B. The secondary particles of the polycrystalline ternary positive electrode material with a lower nickel content are relatively easy to break, which can improve the expansion growth during the cycle process. Although the introduction of this material may lead to relative deterioration of the gas production performance, it can improve the comprehensive performance of the lithium-ion secondary battery as a whole.

In some embodiments, in the lithium-ion secondary battery, the 100% SOC charged unit cell volume shrinkage rate of the polycrystalline low-nickel ternary positive electrode material B2 is generally ≤3%. Through the selection of the 100% SOC charged unit cell volume shrinkage rate, the lattice shrinkage property of the ternary positive electrode material at high SOC can be reflected more accurately.

In some embodiments, the bare cell B is distributed closer to the outside of the bare cell group than the bare cell A, and the bare cell A is distributed closer to the middle of the bare cell group than the bare cell B. This distribution trend can be the overall distribution trend of one or more bare cells A compared with one or more bare cells B, or can be an individual position relationship between a single bare cell A and a single bare cell B. Since the polycrystalline high-nickel ternary positive electrode material B1 included in the bare cell B has more obvious lattice shrinkage at high SOC, the expansion force of the bare cell increases slowly during the charging process, while the single crystal or single crystal-like low-nickel ternary positive electrode material A1 included in the bare cell A has no obvious lattice shrinkage at high SOC, and the increase trend of the expansion force of the bare cell is relatively obvious during the charging process, the bare cell B is placed more outside the bare cell group, which is similar to providing a buffer layer to buffer the bare cell A. Additionally, because the temperature rise of the bare cell in the middle area of the cell is generally more obvious, which is more conducive to the infiltration of electrolyte solution. Distributing the bare cell A in the middle of the bare cell group can further avoid large-area lithium plating of the bare cell A due to reasons such as large expansion force and insufficient infiltration of electrolyte solution in the middle area.

In some embodiments, the second positive electrode sheet further includes a fourth positive-electrode active material selected from a single crystal or single crystal-like low-nickel ternary positive electrode material A2, and the molecular formula of the single crystal or single crystal-like low-nickel ternary positive electrode material A2 may be $LiNi_{x4}Co_{y4}Mn_{1-x4-y4}O_2$. x4 can generally satisfy $0<x4≤0.65$, $0<x4≤0.05$, $0.05≤x4≤0.1$, $0.1≤x4≤0.15$, $0.15≤x4≤0.2$, $0.2≤x4≤0.25$, $0.25≤x4≤0.3$, $0.3≤x4≤0.35$, $0.35≤x4≤0.4$, $0.4≤x4≤0.45$, $0.45≤x4≤0.5$, $0.5≤x4≤0.0.55$, $0.55≤x4≤0.6$, or $0.6≤x4≤0.65$. y4 can generally satisfy $0<y4<0.45$, $0<y4≤0.05$, $0.05≤y4≤0.1$, $0.1≤y4≤0.15$, $0.15≤y4≤0.2$, $0.2≤y4≤0.25$, $0.25≤y4≤0.3$, $0.3≤y4<0.35$, $0.35≤y4<0.4$, or $0.4≤y4<0.45$. Generally speaking, the preferred value range of y4 corresponds to the preferred value range of x4. When x4 can satisfy $0<x4\leq0.55$, y4 can generally satisfy $0<y4<0.45$. $1-x4-y4$ can generally satisfy $0<1-x4-y4<0.45$, $0<1-x4-y4\leq0.05$, $0.05\leq1-x4-y4\leq0.1$, $0.1\leq1-x4-y4\leq0.15$, $0.15\leq1-x4-y4\leq0.2$, $0.2\leq1-x4-y4\leq0.25$, $0.25\leq1-x4-y4\leq0.3$, $0.3\leq1-x4-y4\leq0.35$, $0.35\leq1-x4-y4\leq0.4$, or $0.4\leq1-x4-y4<0.45$. Generally speaking, the preferred value range of $1-x4-y4$ corresponds to the preferred value range of x4. When x4 can satisfy $0<x4\leq0.55$, $1-x4-y4$ can generally satisfy $0<1-x4-y4<0.45$. A single crystal or single crystal-like ternary positive electrode material with a lower nickel content can be further introduced into the bare cell B. As mentioned above, the single crystal or single crystal-like ternary positive electrode material with a lower nickel content has a relatively non-obvious lattice shrinkage effect, but has a better gas production performance. It can cooperate with the ternary positive electrode material with a higher nickel content in the bare cell B to improve the comprehensive performance of the lithium-ion secondary battery as a whole. The usage amount of the single crystal or single crystal-like low-nickel ternary positive electrode material A2 in the bare cell B can be adjusted and optimized based on the actual performance requirements of the battery cell. The proportion of the single crystal or single crystal-like low-nickel ternary positive electrode material A2 in the bare cell B can be moderately increased and the proportion of the polycrystalline high-nickel ternary positive electrode material B1 can be reduced, when the demand for gas production of the bare cell B is high.

In some embodiments, the 100% SOC charged unit cell volume shrinkage rate of the single crystal or single crystal-like low-nickel ternary positive electrode material A2 is generally ≤3%. Through the selection of the 100% SOC charged unit cell volume shrinkage rate, the lattice shrinkage property of the ternary positive electrode material at high SOC can be reflected more accurately.

In some embodiments, in the entire battery system, a mass ratio k of the total mass of the single crystal positive-electrode active material (e.g., including the single crystal or single crystal-like low-nickel ternary positive electrode material A1, the single crystal or single crystal-like low-nickel ternary positive electrode material A2, etc.) to the total mass of the polycrystalline positive-electrode active material (e.g., including the polycrystalline high-nickel ternary positive electrode material B1, the polycrystalline low-nickel ternary positive electrode material B2, etc.) can be 0.5-9, 0.5-1, 1-1.5, 1.5-2, 2-2.5, 2.5-3, 3-3.5, 3.5-4, 4-4.5, 4.5-5, 5-5.5, 5.5-6, 6-6.5, 6.5-7, 7-7.5, 7.5-8, 8-8.5, or 8.5-9. The mass ratio k can generally be adjusted by the use proportion of the bare cell A and the bare cell B, or the use proportion of each ternary positive electrode material included in the bare cell A or the bare cell B, and the like. Generally speaking, when the mass ratio k satisfies the afore-mentioned range, it can enables the lithium-ion secondary battery to have better comprehensive performance as a whole. The reason may be that when the proportion of the polycrystalline positive-electrode active material is too large, the gas production performance of the lithium-ion battery may be deteriorated; and when the proportion of the polycrystalline positive-electrode active material is too small, the improvement of the cyclic expansion may be not sufficient enough. Therefore, the battery is prone to cyclic diving due to a large expansion force and lithium plating in the middle of the bare cell in the later period of the cycle of the battery.

In some embodiments, the coating amount of the positive electrode in the bare cell A and the bare cell B may be substantially the same or different, and the coating amount of the negative electrode in the bare cell A and the bare cell B may also be substantially the same or different. However, the coating amount of the negative electrode of the bare cell A generally should not be too large. For example, the coating amount of the negative electrode in the bare cell A can be ≤0.150 g/1540.25 mm^2. The coating amount of the negative electrode of the bare cell A can be relatively small, which can be more conducive to improving the kinetics of the negative electrode, and avoiding large-area lithium plating of the bare cell A with obvious expansion growth due to excessive expansion growth and insufficient infiltration of electrolyte solution. Correspondingly, the stress on the negative electrode is relieved due to the lattice shrinkage of the polycrystalline positive electrode material in the bare cell B, and thus there is no large-area lithium plating caused by the large expansion force. Therefore, the coating amount of the negative electrode in the bare cell B can be relatively large. The two can be adjusted cooperatively to meet the capacity and energy density requirements of the entire battery cell.

In some embodiments, each ternary positive electrode material (e.g., the single crystal or single crystal-like low-nickel ternary positive electrode material A1, the single crystal or single crystal-like low-nickel ternary positive electrode material A2, the polycrystalline high-nickel ternary positive electrode material B1, the polycrystalline low-nickel ternary positive electrode material B2, etc.) can each independently be a ternary positive electrode material subjected to coating modification. Generally speaking, after proper coating modification, the comprehensive performance (e.g., gas production and other performance) of the ternary positive electrode material can generally be improved, but overall speaking, the lattice shrinkage property of the ternary positive electrode material at high SOC is still closely related to the nickel content in the ternary positive electrode material and/or the 100% SOC charged unit cell volume shrinkage rate. Suitable methods for coating modification of the ternary positive electrode material would be known to those skilled in the art. For example, the gas production performance of the ternary material can be improved by coating lithium iron phosphate nanoparticles on the surface of the high-nickel ternary material.

In general, the lithium-ion secondary battery provided by the present application can include the bare cell A and/or the bare cell B, and the bare cell A and/or the bare cell B may include a positive electrode sheet, a negative electrode sheet, an electrolyte and a separator, etc. During the charging and discharging process of the battery, active ions are intercalated and deintercalated back and forth between the positive electrode sheet and the negative electrode sheet. The electrolyte plays the role of conducting ions between the positive electrode sheet and the negative electrode sheet. The separator is arranged between the positive electrode sheet and the negative electrode sheet, which mainly plays a role of preventing the short circuit between the positive and negative electrodes, and meanwhile allowing ions to pass through.

In the lithium-ion secondary battery provided by the present application, the bare cell A and the bare cell B may each independently include the first positive electrode sheet, the second positive electrode sheet, etc., as described above, the positive electrode sheet may generally include a positive-electrode current collector and a positive-electrode film layer disposed on at least one surface of the positive-electrode current collector, and the composition of the positive-electrode active material in the positive-electrode film layer can be as described above.

As an example, the positive-electrode current collector has two opposite surfaces in its own thickness direction, and the positive-electrode film layer is arranged on either or both of the opposite surfaces of the positive-electrode current collector.

In the lithium-ion secondary battery provided by the present application, a metal foil or a composite current collector can be employed as the positive-electrode current collector. For example, as the metal foil, aluminum foil can be employed. The composite current collector may include a high molecular material substrate layer and a metal layer formed on at least one surface of the high molecular material substrate layer. The composite current collector can be formed by forming a metal material (e.g., aluminum, aluminum alloy, nickel, nickel alloy, titanium, titanium alloy, silver and silver alloy, etc.) on the high molecular material substrate (e.g., polypropylene (PP), polyethylene terephthalate (PET), polybutylene terephthalate (PBT), polystyrene (PS), polyethylene (PE), etc.).

The positive-electrode film layer also optionally includes a conductive agent. However, the type of the conductive agent is not specifically limited, and can be selected by those skilled in the art according to actual needs. As an example, the conductive agent used for the positive-electrode film layer can be selected from one or more of superconducting carbon, acetylene black, carbon black, Ketjen black, carbon dots, carbon nanotube, graphene and carbon nanofiber.

In the present application, the positive electrode sheet can be prepared according to a method known in the art. As an example, the positive-electrode active material, conductive agent and binder of the present application can be dispersed in a solvent (e.g., N-methylpyrrolidone (NMP)) to form a uniform positive-electrode slurry; the positive-electrode slurry is coated on the positive-electrode current collector, and subjected to processes of oven drying, cold pressing, and the like to obtain the positive electrode sheet.

The negative electrode sheet includes a negative-electrode current collector and a negative-electrode film layer arranged on at least one surface of the negative-electrode current collector, wherein the negative-electrode film layer includes a negative-electrode active material.

As an example, the negative-electrode current collector has two opposite surfaces in its own thickness direction, and the negative-electrode film layer is arranged on either or both of the opposite surfaces of the negative-electrode current collector.

In the lithium-ion secondary battery provided by the present application, a metal foil or a composite current collector can be employed as the negative-electrode current collector. For example, as the metal foil, a copper foil can be employed. The composite current collector may include a high molecular material substrate layer and a metal layer formed on at least one surface of the high molecular material substrate. The composite current collector can be formed by forming a metal material (e.g., copper, copper alloy, nickel, nickel alloy, titanium, titanium alloy, silver and silver alloy, etc.) on the high molecular material substrate (e.g., polypropylene (PP), polyethylene terephthalate (PET), polybutylene terephthalate (PBT), polystyrene (PS), polyethylene (PE), etc.).

In the lithium-ion secondary battery provided by the present application, the negative-electrode film layer usually includes a negative-electrode active material, an optional binder, an optional conductive agent and other optional adjuvants, and is usually formed by coating and drying a negative-electrode slurry. The negative-electrode slurry is usually formed by dispersing the negative-electrode active material, the optional conductive agent, the optional binder and the like in a solvent, and stirring them evenly. The solvent can be N-methylpyrrolidone (NMP) or deionized water.

As an example, the conductive agent can be selected from one or more of superconducting carbon, acetylene black, carbon black, Ketjen black, carbon dot, carbon nanotube, graphene and carbon nanofiber.

As an example, the binder can be selected from one or more of styrene-butadiene rubber (SBR), polyacrylic acid (PAA), sodium polyacrylate (PAAS), polyacrylamide (PAM), polyvinyl alcohol (PVA), sodium alginate (SA), polymethacrylic acid (PMAA) and carboxymethyl chitosan (CMCS).

Other optional adjuvants are for example a thickener (such as sodium carboxymethylcellulose (CMC-Na)), etc.

In the lithium-ion secondary battery provided by the present application, in addition to the negative-electrode active material, the negative electrode film layer further optionally includes other commonly used negative-electrode active materials. For example, as other commonly used negative-electrode active materials, artificial graphite, natural graphite, soft carbon, hard carbon, silicon-based materials, tin-based materials and lithium titanate, etc. can be listed. The silicon-based material can be selected from one or more of elemental silicon, a silicon-oxygen compound, a silicon-carbon composite, a silicon-nitrogen composite and silicon alloy. The tin-based material can be selected from one or more of elemental tin, a tin-oxygen compound and tin alloy.

The electrolyte plays the role of conducting ions between the positive electrode sheet and the negative electrode sheet. The present application has no specific limitation on the type of the electrolyte, which can be selected according to requirements. For example, the electrolyte may be selected from at least one of a solid electrolyte and a liquid electrolyte (i.e., an electrolyte solution).

In some embodiments, the electrolyte solution can be employed as the electrolyte, and the electrolyte solution may include an electrolyte salt and a solvent.

In some embodiments, the electrolyte salt can be one or more selected from lithium hexafluorophosphate ($LiPF_6$), lithium tetrafluoroborate ($LiBF_4$), lithium perchlorate ($LiClO_4$), lithium hexafluoroarsenate ($LiAsF_6$), lithium bis (fluorosulfonyl)imide (LiF SI), lithium bis(trifluoromethanesulfonyl)imide (LiTF SI), lithium trifluoromethanesulfonate (LiTFS), lithium difluoro(oxalato)borate (LiDFOB), lithium bis(oxalate)borate (LiBOB), lithium difluorophosphate ($LiPO_2F_2$), lithium difluoro bis (oxalato)phosphate (LiDFOP) and lithium tetrafluoro(oxalato)phosphate (LiTFOP).

In some embodiments, the solvent can be one or more selected from ethylene carbonate (EC), propylene carbonate (PC), ethyl methyl carbonate (EMC), diethyl carbonate (DEC), dimethyl carbonate (DMC), dipropyl carbonate (DPC), methyl propyl carbonate (MPC), ethyl propyl carbonate (EPC), butylene carbonate (BC), fluoroethylene carbonate (FEC), methyl formate (MF), methyl acetate (MA), ethyl acetate (EA), propyl acetate (PA), methyl propionate (MP), ethyl propionate (EP), propyl propionate (PP), methyl butyrate (MB), ethyl butyrate (EB), 1,4-butyrolactone (GBL), sulfolane (SF), dimethyl sulfone (MSM), methyl ethyl sulfone (EMS) and diethyl sulfone (ESE).

In some embodiments, an additive is optionally included in the electrolyte solution. For example, the additive may include a negative-electrode film-forming additive, or may include a positive-electrode film-forming additive, or may include an additive that capable of improving some performances of the battery, such as an additive for improving the overcharge performance of the battery, an additive for improving the high-temperature performance of the battery, an additive for improving the low-temperature performance of the battery, and the like.

A separator is further included in the lithium-ion secondary battery employing the electrolyte solution, and in some lithium-ion secondary batteries employing the solid electrolyte. The separator is arranged between the positive electrode sheet and the negative electrode sheet, and plays the role of isolation. The present application has no particular limitation on the types of the separator, and any well-known separator of a porous structure with good chemical stability and mechanical stability can be selected for use. In some embodiments, the material of the separator can be selected from one or more of glass fiber, non-woven cloth, polyethylene, polypropylene and polyvinylidene fluoride. The separator may be a single-layer thin film or a multi-layer composite thin film, and is not particularly limited. When the separator is a multi-layer composite thin film, the material of each layer may be the same or different, and there is no particular limitation on it.

In some embodiments, the positive electrode sheet, the negative electrode sheet and the separator can be made into an electrode assembly by a winding process or a lamination process.

In some embodiments, the lithium-ion secondary battery may include an outer package. The outer package can be used for packaging the afore-mentioned electrode assembly and the electrolyte.

In some embodiments, the outer package of the lithium-ion secondary battery may be a hard case, such as a hard plastic case, an aluminum case, a steel case, etc. The outer package of the lithium-ion secondary battery may also be a soft package, such as a bag-type soft package. The material of the soft package can be plastic, and as the plastic, polypropylene (PP), polybutylene terephthalate (PBT), polybutylene succinate (PBS) and the like can be listed.

Figure 2:
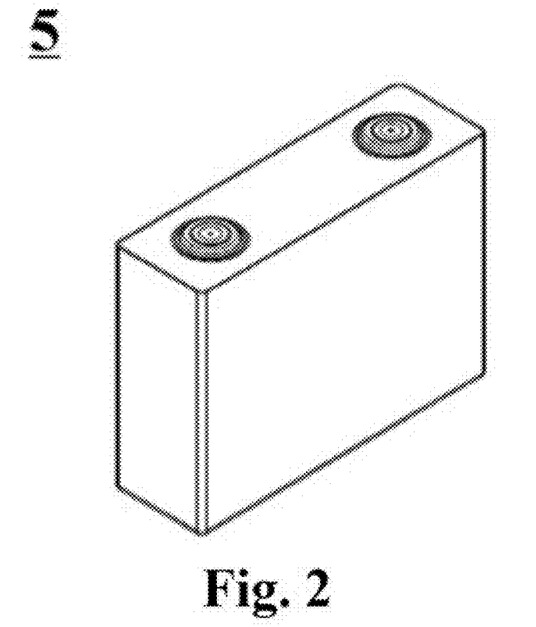
FIG. 2 is a schematic diagram of a lithium-ion secondary battery according to an embodiment of the present application.

The present application has no particular limitation on the shape of the lithium-ion secondary battery, which can be cylindrical, square or any other shape. For example, FIG. 2 shows a lithium-ion secondary battery 5 with a square structure as an example.

Figure 3:
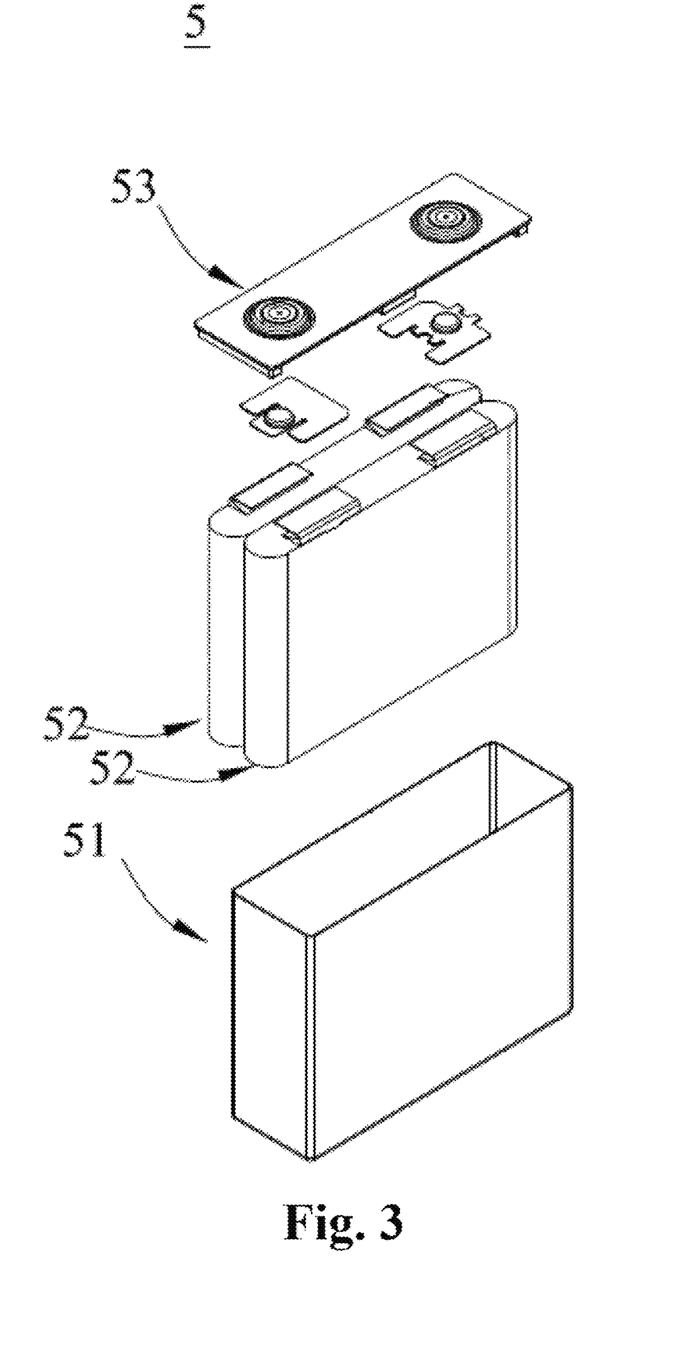
FIG. 3 is an exploded view of the lithium-ion secondary battery according to an embodiment of the present application shown in FIG. 2.

In some embodiments, referring to FIG. 3, the outer package may include a case 51 and a cover plate 53. The case 51 may include a bottom plate and a side plate connected to the bottom plate, with the bottom plate and the side plate enclosing to form an accommodating cavity. The case 51 has an opening in communication with the accommodating cavity, and the cover plate 53 can cover the opening to close the accommodating cavity. The positive electrode sheet, the negative electrode sheet and the separator can be subjected to a winding or laminating process to form an electrode assembly 52. The electrode assembly 52 is packaged in the accommodating cavity. The electrolyte solution is infiltrated in the electrode assembly 52. The number of the electrode assemblies 52 included in the lithium-ion secondary battery 5 can be one or more, which can be selected by those skilled in the art according to specific practical requirements.

Battery Module

In some embodiments, the lithium-ion secondary batteries can be assembled into a battery module, and the number of the lithium-ion secondary batteries included in the battery module can be one or more, and the specific number can be selected by those skilled in the art according to the application and capacity of the battery module.

Figure 4:
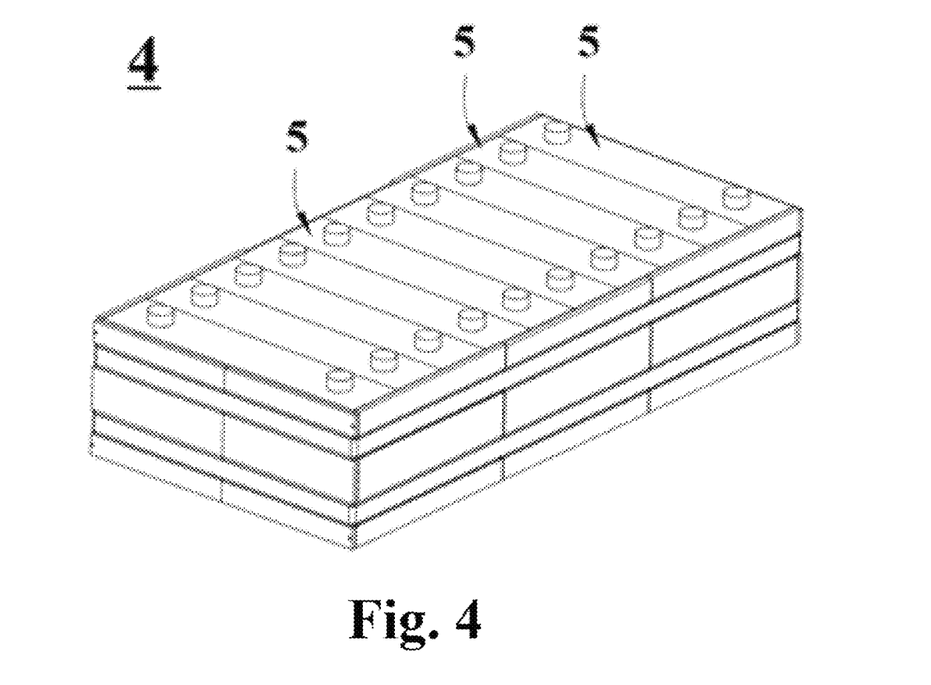
FIG. 4 is a schematic diagram of a battery module according to an embodiment of the present application.

FIG. 4 shows a battery module 4 as an example. Referring to FIG. 4, in the battery module 4, multiple lithium-ion secondary batteries 5 may be sequentially arranged along a length direction of the battery module 4. Of course, they can also be arranged in any other way. The multiple lithium-ion secondary batteries 5 can be further fixed by fasteners.

Optionally, the battery module 4 may further include a case having an accommodating space in which the multiple lithium-ion secondary batteries 5 are accommodated.

Battery Pack

In some embodiments, the afore-mentioned battery modules can also be assembled into a battery pack, and the number of the battery modules included in the battery pack can be selected by those skilled in the art according to the application and capacity of the battery pack.

Figure 5:
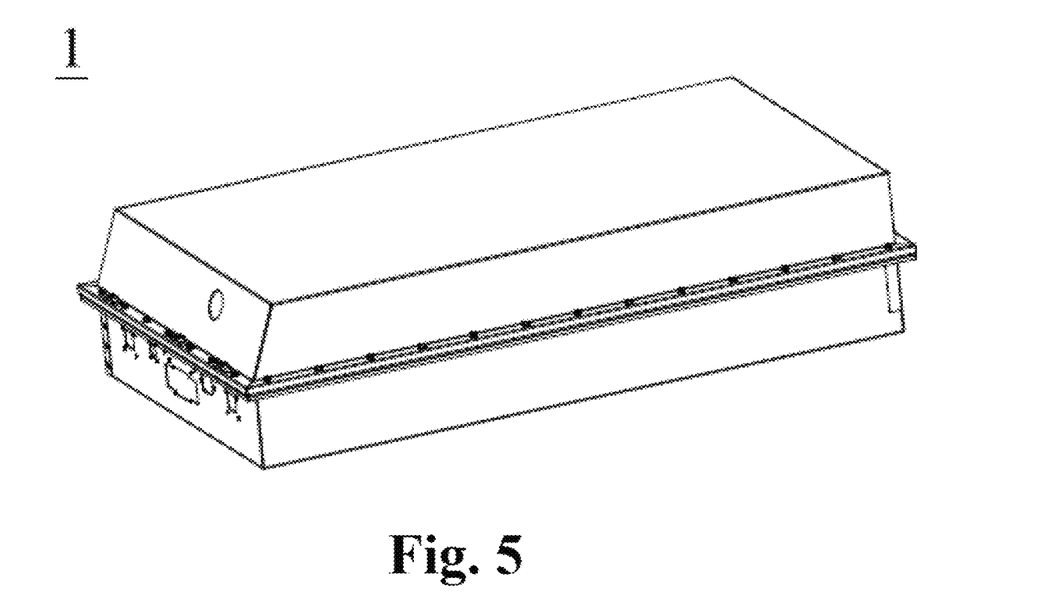
FIG. 5 is a schematic diagram of a battery pack according to an embodiment of the present application.
Figure 6:
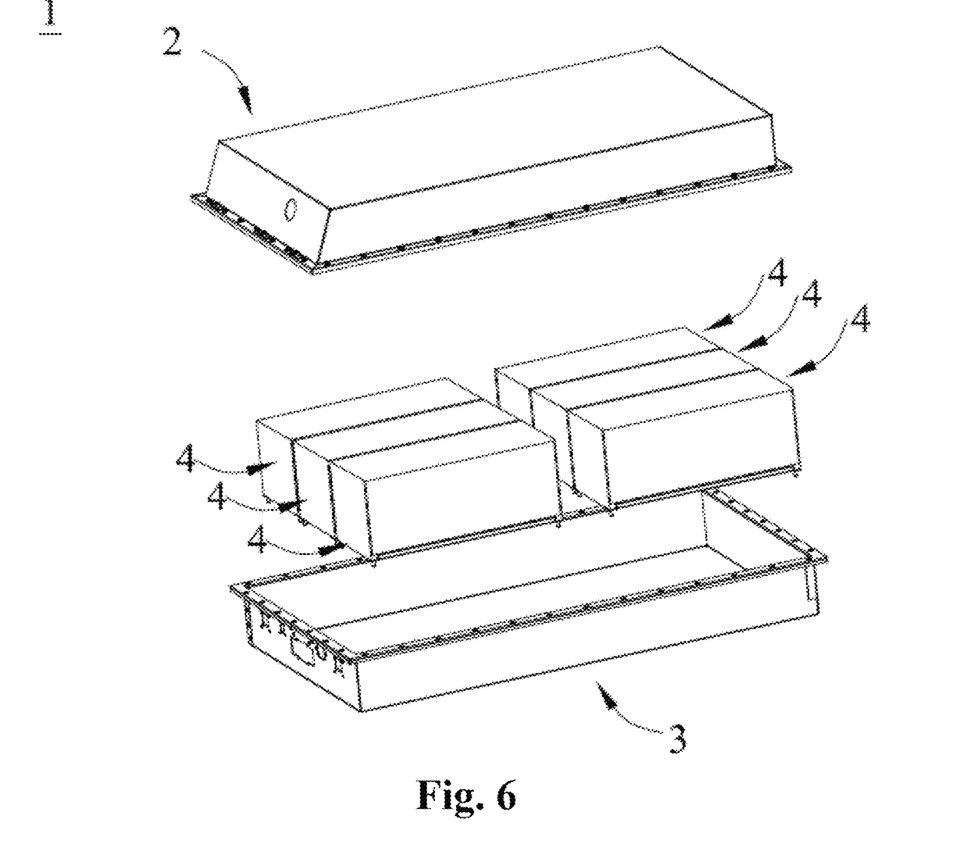
FIG. 6 is an exploded view of the battery pack according to an embodiment of the present application shown in FIG. 5.

FIGS. 5 and 6 show a battery pack 1 as an example. Referring to FIGS. 5 and 6, the battery pack 1 may include a battery box and multiple battery modules 4 disposed in the battery box. The battery box includes an upper box 2 and a lower box 3, the upper box 2 can cover the lower box 3 to form a closed space for accommodating the battery modules 4. The multiple battery modules 4 can be arranged in the battery box in any way.

Powered Device

Additionally, the present application also provides a powered device which can include one or more of the lithium-ion secondary battery, the battery module, or the battery pack provided by the present application. The afore-mentioned lithium-ion secondary battery, battery module, or battery pack can be used as a power source of the device, or as an energy storage unit of the device. The afore-mentioned powered device can be, but is not limited to, mobile devices (e.g., a mobile phone, a laptop, etc.), electric vehicles (e.g., an all-electric vehicle, a hybrid electric vehicle, a plug-in hybrid electric vehicle, an electric bicycle, an electric scooter, an electric golf cart, an electric truck, etc.), electric trains, ships and satellites, energy storage systems, etc.

For the afore-mentioned powered device, the lithium-ion secondary battery, battery module, or battery pack can be selected according to the use requirements of the device.

Figure 7:
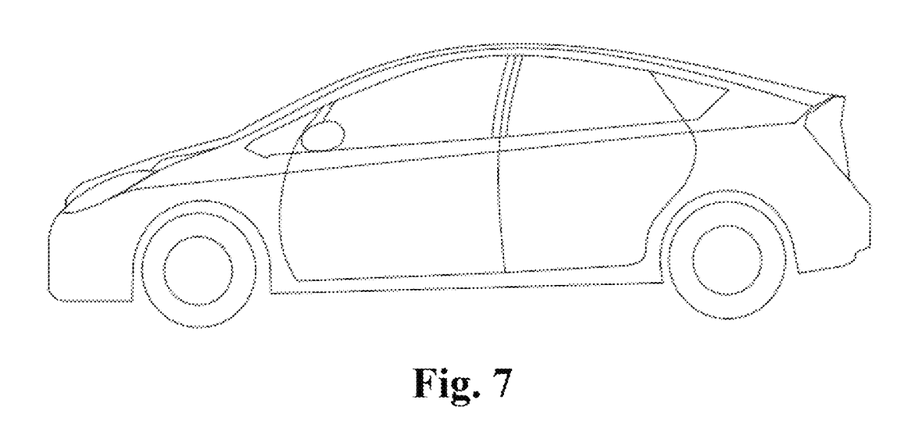
FIG. 7 is a schematic diagram of a device in which a lithium-ion secondary battery according to an embodiment of the present application is used as a power source.

FIG. 7 shows a powered device as an example. The powered device is an all-electric vehicle, a hybrid electric vehicle, a plug-in hybrid electric vehicle, and the like. In order to satisfy the high power and high energy density requirements of the powered device for the lithium-ion secondary battery, the battery pack or battery module can be employed.

As another example, the powered device may be a mobile phone, a tablet computer, a laptop, etc. The powered device is generally required to be light and thin, and thus a lithium-ion secondary battery can be employed as the power source.

The present application will be further illustrated by the following examples, but the scope of the present application is not limited thereby.

The main materials and parameter information used in the examples are as follows:

single crystal NCM523 (LiNi$_{0.55}$Co$_{0.15}$Mn$_{0.3}$O$_2$), with the 4.35 V full battery first cycle discharge gram capacity being about 182 mAh/g, and the 100% SOC unit cell volume shrinkage rate being about 2.27%;

polycrystalline NCM712 (LiNi$_{0.7}$Co$_{0.10}$Mn$_{0.2}$O$_2$), with the 4.35 V full battery first cycle discharge gram capacity being about 197 mAh/g, and the 100% SOC unit cell volume shrinkage rate being about 4.04%;

polycrystalline NCM523 (LiNi$_{0.56}$Co$_{0.12}$Mn$_{0.32}$O$_2$), with the 4.35 V full battery first cycle discharge gram capacity being about 182 mAh/g, and the 100% SOC unit cell volume shrinkage rate being about 2.30%.

The mass ratio k of the active materials in the whole battery cell=the mass of the single crystal positive-electrode active material/the mass of the polycrystalline positive-electrode active material, wherein the single crystal positive-electrode active material includes the afore-mentioned single crystal NCM523, etc., and the polycrystalline positive-electrode active material includes the afore-mentioned polycrystalline NCM712, polycrystalline NCM523, etc.

Example 1

The preparation of positive electrode sheet: the ternary positive electrode material single crystal NCM523 as a positive-electrode active material, carbon black as a conductive agent, and polyvinylidene fluoride as a binder were mixed at a mass ratio of 96:2:2. By using N-methylpyrrolidone as a solvent, they were mixed uniformly to form a positive-electrode slurry with a solid content of the slurry of 64%. The positive-electrode slurry was uniformly coated (double-sided coated) on an aluminum foil as a positive-electrode current collector; oven-dried, and then subjected to cold-pressing, edge trimming, slitting and cutting to form the positive electrode sheet, wherein the coating amount on a single side of the foil is 0.260 g/1540.25 mm$^2$ (the total mass of the mixed material, excluding the substrate).

Preparation of negative electrode sheet: artificial graphite as a negative-electrode active material, carbon black as a conductive agent, styrene-butadiene rubber (SBR) (with a solid content of 0.48) as a binder, and added sodium carboxymethyl cellulose as a thickener were mixed uniformly under stirring according to a mass ratio of 96.9:0.5:1.5:1.1 to form a negative-electrode slurry, and the negative-electrode slurry was uniformly coated (double-sided coated) on a copper foil as a negative-electrode current collector; oven-dried, and then subjected to cold pressing, edge trimming, slitting, and cutting to form the negative electrode sheet, wherein the coating amount on a single side of the foil was 0.155 g/1540.25 mm$^2$ (the total mass of the mixed material, excluding the substrate).

Preparation of separator: a thin polyethylene film with a thickness of 7 μm was taken as a substrate of the separator; then an inorganic oxide layer slurry was coated onto one side of the substrate (polyethylene) of the separator with a thickness of 7 μm, with the slurry amount being controlled by a micro gravure coating method, wherein the inorganic oxide layer slurry composed of inorganic aluminum oxide powder, polyvinylpyrrolidone, and acetone as a solvent were mixed at a mass ratio of 3:1:6 and oven-dried to obtain the separator with a first coating. Polyvinylidene fluoride (PVDF), acetone as a solvent and ethyl acetate were mixed uniformly under stirring at a mass ratio of 5:40:55 to form a slurry, and then the afore-mentioned slurry was spray-coated onto the prepared separator with the first coating, and oven-dried to form a second coating layer with a single-side thickness of 1 μm on the first coating layer, thereby obtaining the final separator.

The afore-mentioned positive electrode sheet, separator and negative electrode sheet were stacked in sequence, so that the separator was placed between the positive electrode sheet and the negative electrode sheet to play a role of isolation, and then they were wound to obtain the bare cell A.

The preparation process of the bare cell B was the same as that of the bare cell A, except that the ternary positive electrode material polycrystalline NCM712 was used as the positive-electrode active material, the single-side coating weight of the positive electrode sheet was 0.257 g/1540.25 mm$^2$ (excluding the substrate), the single-side coating weight of the positive electrode sheet was 0.163 g/1540.25 mm$^2$ (excluding the substrate), and the length of the electrode sheet was slightly different.

Figure 1:
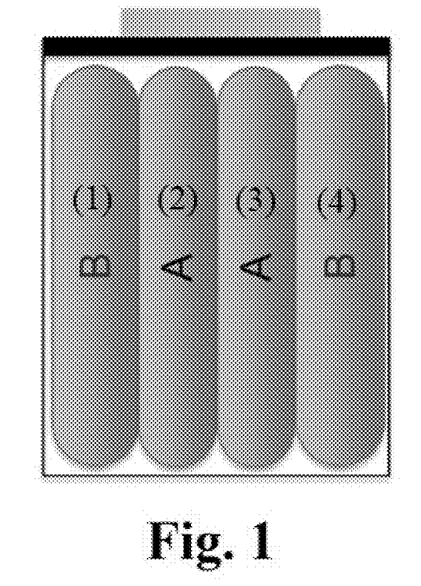
FIG. 1 is a schematic diagram showing the position of a bare cell in a bare cell accommodating cavity of Example 1 of the present invention.

The assembly process of the battery cell was shown in FIG. 1. In the figure, A represented the bare cell A, and B represented the bare cell B. In a bare cell accommodating cavity with an inner cavity volume of 47582 mm$^3$ (cuboid space), the bare cell B was placed in outer areas (1) and (4), and the bare cell A was placed in the middle areas (2) and (3). The composition of the electrolyte solution was: 1 mol/L of lithium hexafluorophosphate (LiPF$_6$), and a solvent of ethylene carbonate (EC) and dimethyl carbonate (DMC) with a solvent EC:DMC volume ratio of 9:1. The battery cell was subjected to the processes of liquid injection, chemical formation, gas exhausting, sealing, etc. to complete the manufacture of the battery.

The mass ratio k of the active materials in the whole battery cell was 1.08.

Example 2

The preparation process of the lithium-ion battery as a whole referred to that of Example 1, except that the number of the bare cells B was only one, the distribution position of it was in the area (4), and the mass ratio k of the active materials in the entire battery cell was 3.44.

Example 3

The preparation process of the lithium-ion battery as a whole referred to that of Example 1, except that the positive-electrode active material of the bare cell B was a physical mixture of the single crystal NCM523+the polycrystalline NCM712 at a mass ratio of 5:5, and the mass ratio k of the active materials in the entire battery cell was 3.13.

Example 4

The preparation process of the lithium-ion battery as a whole referred to that of Example 1, except that the positive-electrode active material of the bare cell B was a physical mixture of the single crystal NCM523+the polycrystalline NCM712 at a mass ratio of 7:3, and the mass ratio k of the active materials in the entire battery cell was 5.85.

Example 5

The preparation process of the lithium-ion battery as a whole referred to that of Example 1, except that the positive-electrode active material of the bare cell B was the polycrystalline Ni55, and the mass ratio k of the active materials in the entire battery cell was 1.00.

Example 6

The preparation process of the lithium-ion battery as a whole referred to that of Example 1, except that the layer number of the bare cell A was different, and the mass ratio k of the active materials in the entire battery cell was 1.07.

Example 7

The preparation process of the lithium-ion battery as a whole referred to that of Example 3, except that the single crystal NCM523 was replaced by the polycrystalline NCM523 in the bare cell B, and the mass ratio k of the active materials in the entire battery cell was 1.06.

Example 8

The preparation process of the lithium-ion battery as a whole referred to that of Example 1, except that the bare cell A was placed in the outer areas (1) and (4), the bare cell B was placed in the middle areas (2) and (3), and the mass ratio k of the active materials in the entire battery cell was 1.08.

Example 9

The preparation process of the lithium-ion battery as a whole referred to that of Example 1, except that the positive-electrode active material of the bare cell B was a physical mixture of the single crystal NCM523+the polycrystalline NCM712 at a mass ratio of 8:2, and the mass ratio k of the active materials in the entire battery cell was 9.26.

Example 10

The preparation process of the lithium-ion battery as a whole referred to that of Example 1, except that the bare cell A was placed in the middle area (2), the bare cell B was placed in the outer areas (1), (3) and (4), and the mass ratio k of the active materials in the entire battery cell was 0.35.

Comparative Example 1

The preparation process of the lithium-ion battery as a whole referred to that of Example 1, except that the bare cells were all the bare cells A.

Comparative Example 2

The preparation process of the lithium-ion battery as a whole referred to that of Example 1, except that the bare cells were all the bare cells B.

Comparative Example 3

The preparation process of the lithium-ion battery as a whole referred to that of Example 1, except that the bare cells were all the bare cells B, and the positive-electrode active material of the bare cell B was a physical mixture of the single crystal NCM523+the polycrystalline NCM712 at a mass ratio of 5:5.

The lithium-ion batteries prepared in the Examples and Comparative Examples were tested for performance, and the measurement methods of each performance test were specifically as follows.

Cycling performance test (capacity retention rate after 1000 cycles): under the condition of a temperature of $25\pm2°$ C., an initial pressure of $2,000\pm300$ N was applied onto a battery, the battery was charged to 4.35 V with a step-by-step charging strategy, and then discharged to 2.8 V at a current of 1C. such cycles were repeated, and the capacity retention rate of the battery after 1,000 cycles was recorded. The test results were as shown in Table 1.

Gas production performance test (gas production when stored at 70° C. and 4.35 V for 40 days): a battery cell reserved before welding of sealing nails during a battery manufacture process was used for manufacturing a gas-producing battery cell, and the manufacture and testing process of the gas-producing battery cell was as follows: a gas-producing nail was welded by laser at a liquid injection port, the other end of the gas-producing nail was connected with a plastic hose filled with silicone oil, and the other end of the plastic hose was connected with an air pressure gauge. Conditions of the gas production test: for the initial pressure of $2,000\pm300$ N on the battery, the battery was fully charged to 4.35 V, and then tested in a high temperature furnace at 70° C. (stored for 40 days), and the change of the air pressure gauge was recorded. The test results were as shown in Table 1.

Battery capacity test: under a condition of a temperature of $25\pm2°$ C., the battery was discharged to 2.8 V at a current of ⅓C, then charged to 4.35 V at the current of ⅓C, and charged at a constant voltage until the current dropped to 0.05C to finish full charging of the battery, and finally the battery was discharged to 2.8 V at the current of ⅓C. What is obtained was the initial battery capacity C0 of the battery.

Battery energy density test: during the process of the battery capacity test, the battery was converted from a fully charged state (100% SOC) to a fully discharged state (0% SOC), the discharge voltage-capacity curve was integrated to obtain the total battery discharge energy, and the battery energy density=the total battery discharge energy/total battery weight.

Battery case-put-in thickness group margin: for a hard-case battery cell, it was the thickness of the bare battery cell after winding/the maximum thickness left in the case for the battery cell, which was reserved in order to ensure assembly and later expansion.

XRD: X-ray diffraction (XRD) is one of the most commonly used characterization means for analyzing the structure of a material. The periodic repeating structure of a crystal enables it to have a diffraction effect on X-rays, wherein the position of an X-ray diffraction line is related to the unit cell parameters (the shape and size of unit cells), i.e., depending on the spacing among the crystal faces; the relative intensity of the diffraction line depends on the type, number and arrangement manner of atoms in the unit cells. X-ray diffraction on a specific crystal material reflects a diffraction pattern of a specific crystal structure, so that the phase structure of a material can be analyzed through the diffraction pattern. Diffraction peaks of the powder crystal diffraction method overlap seriously, so it is difficult to separate and obtain an accurate diffraction intensity, and the crystal information of a structure is lost to some extent, so it is difficult to obtain accurate crystal structure data. Hugo M. Rietveld proposed a Rietveld full-spectrum fitting method to correct the crystal structure by conducting full-spectrum fitting with polycrystalline diffraction data, wherein based on the given initial crystal structure model and parameters, a diffraction spectrum is calculated by using a suitable peak shape function, and the crystal structure parameters and peak shape parameters are continuously adjusted by using a least square method, so that the calculated spectrum and the experimental spectrum gradually coincide, thereby obtaining the corrected structure parameters. The refinement software used for Rietveld structure refinement of the data in the present application was the General Structure Analytic System (GSAS) software (Toby B. H. EXPGUI, a graphical user interface for GSAS [J]. Journal of Applied Crystallography, 2001, 34, 210-213).

Figure 9:
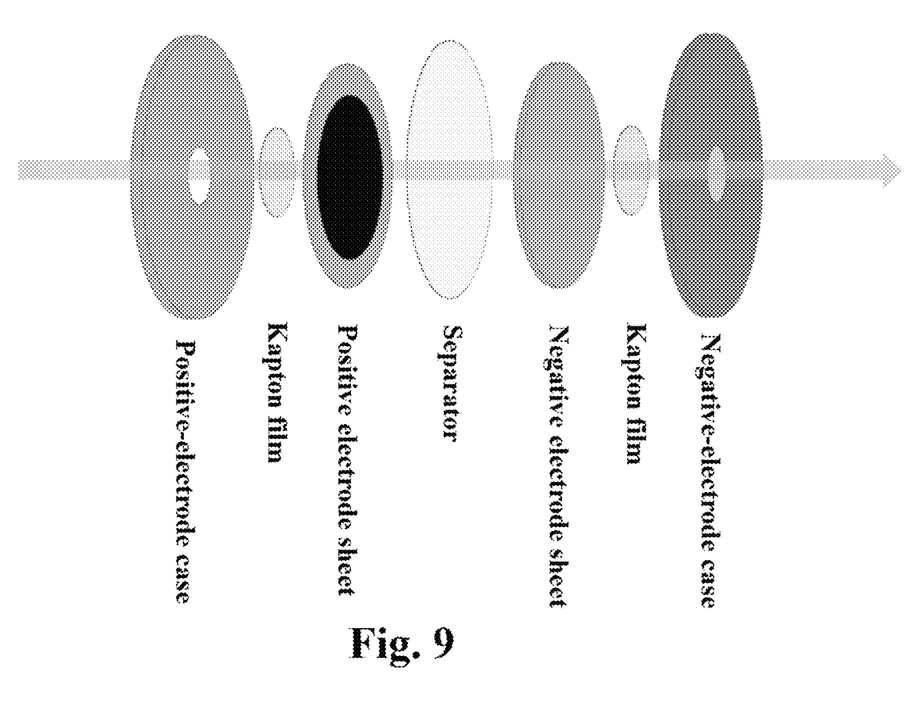
FIG. 9 shows a schematic diagram of the design of a synchrotron radiation in-situ XRD electrolytic cell used in an embodiment of the present application.

Electrochemical in situ XRD is an important method for testing the structural evolution of a material during a charging and discharging process. Testing of the in situ XRD usually requires the use of a high-energy synchrotron radiation light source. Synchrotron radiation is a kind of extremely strong electromagnetic radiation emitted along a tangential direction of the orbital curve when high-energy charged particles with a speed close to the speed of light move in a magnetic field in a curvilinear motion manner. The synchrotron radiation light source has the characteristics of wide band, high collimation, high polarization, high purity, high brightness, and the like. The design of a synchrotron radiation in-situ XRD electrolytic cell is shown in FIG. 9, in which a Kapton film is used as a sealing window, and the test mode is a transmission mode.

The X-ray diffraction of synchrotron radiation in the experiment of the present application was carried out with the light beam 11-ID-D of an advanced light source in Argonne National Laboratory, US with an X-ray diffraction wavelength of 0.799898 Å and a test range of 10-80°, and the data was collected with a flat-panel detector with the sampling interval of about 10 min.

Figure 8:
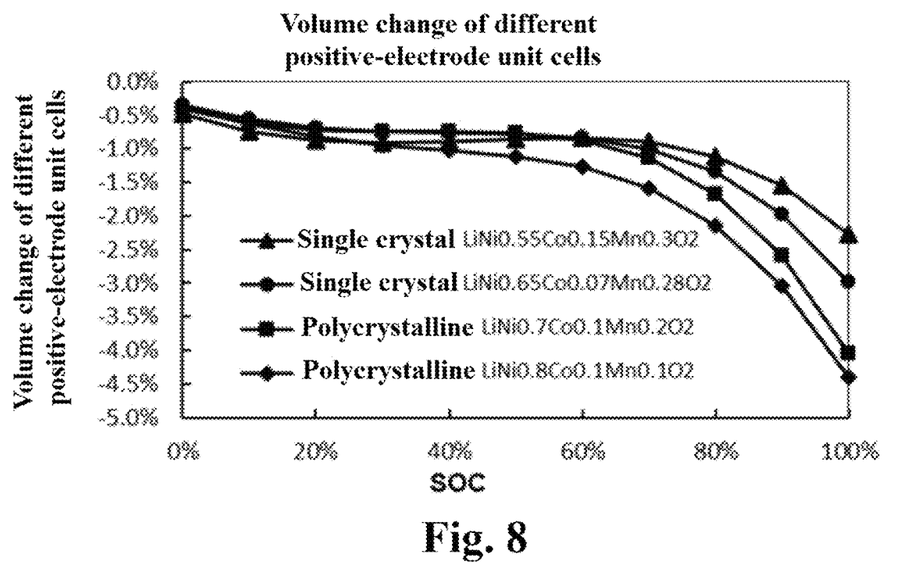
FIG. 8 shows a schematic diagram illustrating the change in the unit cell volume of a positive electrode of a positive-electrode active material used in an embodiment of the present application under different delithiation states (SOC).

During the charging process of the battery (from fully discharged state 0% SOC to fully charged state 100% SOC), the positive electrode was continuously delithiated. For the ternary material, the diffraction peak of the material could be attributed to a hexagonal layered structure of α-NaFeO$_2$ with a R-3m space group. During the deintercalation process of lithium ions, the change of the interplanar crystal spacing between the (003) peak and the (110) peak in the XRD pattern represented the change of the unit cell parameters c and a. The in-situ battery was charged and discharged for the first cycle, so as to obtain the XRD patterns of the positive electrode under different delithiation states (SOCs). Rietveld refinement was performed on the XRD patterns of different delithiation states by employing the GSAS software, so as to obtain the changes of unit cell parameters a and c under different delithiation states. A unit cell volume was calculated by utilizing the unit cell parameters: $V=a^2*c*\sin 120°$, so that the change in the unit cell volume of a positive electrode under different delithiation states (SOC) could be obtained (see FIG. 8): an XRD pattern of an initial positive electrode with lithium fully intercalated (corresponding to the full battery 0% SOC) was subjected to Rietveld fitting to obtain unit cell parameters $c_0$, $a_0$, and thus the initial unit cell volume $V_0$ was obtained through calculation. As the charging progressed, the lithium ions were continuously deintercalated from the positive electrode (corresponding to the increase of the full battery SOC), the XRD pattern of the positive electrode under different delithiation states (SOC) was obtained, which was subjected to Rietveld fitting to obtain the unit cell parameters c and a of the positive electrode under different delithiation states, and through calculation, the unit cell volume V was obtained, so as to obtain the change in the unit cell volume of the positive electrode under different delithiation states (SOC)=$(V-V_0)/V_0$. When the value of the unit cell volume V corresponded to the state of full battery 100% SOC, the result obtained from the afore-mentioned formula was the 100% SOC charged unit cell volume shrinkage rate. SOC: State of Charge, which refers to the percentage of remaining electric quantity of a battery, 100% representing a fully charged state, and 0% representing a fully discharged state.

TABLE 1

| | | Bare battery cell A | | | | | |
|---|---|---|---|---|---|---|---|
| Group | Material | Quantity (pieces) | Number of positive electrode layers | Length of positive electrode (mm) | Coating amount on a single side of foil (g/1540.25 mm^2) | | Distribution location |
| | | | | | Positive electrode | Negative electrode | |
| Example 1 | Single crystal NCM523 | 2 | 64 | 8882.20 | 0.260 | 0.155 | (2) and (3) |
| Example 2 | Single crystal NCM523 | 3 | 64 | 8882.20 | 0.260 | 0.155 | (1), (2) and (3) |
| Example 3 | Single crystal NCM523 | 2 | 64 | 8882.20 | 0.260 | 0.155 | (2) and (3) |
| Example 4 | Single crystal NCM523 | 2 | 64 | 8882.20 | 0.260 | 0.155 | (2) and (3) |
| Example 5 | Single crystal NCM523 | 2 | 64 | 8864.52 | 0.254 | 0.151 | (2) and (3) |
| Example 6 | Single crystal NCM523 | 2 | 66 | 9166.19 | 0.250 | 0.149 | (2) and (3) |
| Example 7 | Single crystal NCM523 | 2 | 64 | 8882.20 | 0.260 | 0.155 | (2) and (3) |
| Example 8 | Single crystal NCM523 | 2 | 64 | 8882.20 | 0.260 | 0.155 | (1) and (4) |
| Example 9 | Single crystal NCM523 | 2 | 64 | 8882.20 | 0.260 | 0.155 | (2) and (3) |
| Example 10 | Single crystal NCM523 | 1 | 64 | 8882.20 | 0.260 | 0.155 | (2) |

TABLE 1-continued

| Group | Material | Quantity (pieces) | | | | | |
|---|---|---|---|---|---|---|---|
| Comparative Example 1 | Single crystal NCM523 | 4 | 64 | 8864.52 | 0.254 | 0.151 | (1), (2), (3) and (4) |
| Comparative Example 2 | Single crystal NCM523 | | | | | | |
| Comparative Example 3 | Single crystal NCM523 | | | | | | |

| | | | | | Bare battery cell B | | |
| | | | | | Coating amount on a single side of foil (g/1540.25 mm^2) | | |
| Group | Material | Quantity (pieces) | Number of positive electrode layers | Length of positive electrode (mm) | Positive electrode | Negative electrode | Distribution location |
|---|---|---|---|---|---|---|---|
| Example 1 | Polycrystalline NCM712 | 2 | 60 | 8296.24 | 0.257 | 0.163 | (1) and (4) |
| Example 2 | Polycrystalline NCM712 | 1 | 60 | 8263.03 | 0.244 | 0.155 | (4) |
| Example 3 | Single crystal NCM523: polycrystalline NCM712 = 5:5 | 2 | 60 | 8296.15 | 0.262 | 0.161 | (1) and (4) |
| Example 4 | Single crystal NCM523: polycrystalline NCM712 = 7:3 | 2 | 60 | 8296.25 | 0.264 | 0.160 | (1) and (4) |
| Example 5 | Polycrystalline Ni55 | 2 | 64 | 8864.52 | 0.254 | 0.151 | (1) and (4) |
| Example 6 | Polycrystalline NCM712 | 2 | 60 | 8296.24 | 0.257 | 0.163 | |
| Example 7 | Polycrystalline NCM523: polycrystalline NCM712 = 5:5 | 2 | 60 | 8296.15 | 0.262 | 0.161 | (1) and (4) |
| Example 8 | Polycrystalline NCM712 | 2 | 60 | 8296.24 | 0.257 | 0.163 | (2) and (3) |
| Example 9 | Single crystal NCM523: polycrystalline NCM712 = 8:2 | 2 | 60 | 8296.28 | 0.265 | 0.160 | (1) and (4) |
| Example 10 | Polycrystalline NCM712 | 3 | 60 | 8307.61 | 0.261 | 0.166 | (1), (3) and (4) |
| Comparative Example 1 | | | | | | | |
| Comparative Example 2 | Polycrystalline NCM712 | 4 | 60 | 8312.85 | 0.263 | 0.167 | (1), (2), (3) and (4) |
| Comparative Example 3 | Single crystal NCM523: polycrystalline | 4 | 60 | 8312.46 | 0.268 | 0.165 | (1), (2), (3) and (4) |

TABLE 1-continued

NCM712 = 5:5

| Group | Mass ratio of active materials in the whole battery cell | Capacity retention rate (1000 cycles) | Gas production (Mpa) when stored at 70° C. and 4.35 V for 40 days | Initial battery capacity C0 (Ah) | Battery energy density (Wh/kg) | Battery case-put-in thickness group margin (%) |
|---|---|---|---|---|---|---|
| Example 1 | 1.08 | 91.7% | 0.25 | 177.50 | 240.37 | 89.20% |
| Example 2 | 3.44 | 90.0% | 0.22 | 175.16 | 234.99 | 89.20% |
| Example 3 | 3.13 | 90.2% | 0.22 | 175.71 | 235.72 | 89.20% |
| Example 4 | 5.85 | 90.0% | 0.21 | 174.99 | 234.73 | 89.20% |
| Example 5 | 1.00 | 90.8% | 0.23 | 172.99 | 232.10 | 89.20% |
| Example 6 | 1.07 | 92.30% | 0.25 | 177.09 | 239.81 | 89.20% |
| Example 7 | 1.06 | 90.5% | 0.23 | 175.71 | 235.72 | 89.20% |
| Example 8 | 1.08 | 90.5% | 0.25 | 177.50 | 240.37 | 89.20% |
| Example 9 | 9.26 | 85.0% | 0.21 | 174.62 | 233.57 | 89.20% |
| Example 10 | 0.35 | 91.0% | 0.30 | 179.91 | 241.89 | 89.20% |
| Comparative Example 1 | | <82% (with a "diving" trend) | 0.20 | 172.99 | 232.10 | 89.20% |
| Comparative Example 2 | | 92.0% | 0.33 | 182.20 | 244.46 | 89.20% |
| Comparative Example 3 | 1.00 | 89.5% | 0.26 | 178.45 | 239.45 | 89.20% |

It can be seen according to the afore-mentioned Tables 1A, 1B and 1C that, compared with the comparative examples, the examples of the present application all could obtain better comprehensive performance, and could avoid the diving tendency or excessive gas production of the lithium-ion battery. Specifically, it can be seen from Example 1 in comparison with Comparative Examples 1 and 2, and Example 3 in comparison with Comparative Example 3 that when different positive electrode bare cells were cooperatively used in the battery cell, the lithium-ion battery could obtain better comprehensive performance, and could avoid the diving tendency or excessive gas production of the lithium-ion battery.

Additionally, although as described above, the embodiments of the present application can achieve better comprehensive performance than the comparative examples and can avoid the diving tendency or excessive gas generation of the lithium-ion battery, it can be found from Example 1 in comparison with Example 8 that when the bare cell B including the polycrystalline high-nickel material was placed outside the battery cell, the lithium-ion battery could obtain better cycling performance; and when the cycle had been repeated for 1,000 times, the capacity retention rate of Example 1 was significantly improved compared with that of Example 8.

It can be found from other examples in comparison with Examples 9 and 10 that when the proportion of the high-nickel active material was too large, there was a possibility that the gas production performance of the lithium-ion battery deteriorates; and when the proportion of the high-nickel active material was too small, there might be situations that the improvement in the cyclic expansion is not obvious, and the battery is prone to cyclic diving due to a large expansion force and lithium plating in the middle of the bare cell in the later period of the cycle of the battery, and the like.

It can be found from Example 7 that the polycrystalline ternary positive electrode material with a lower nickel content could be further introduced into the bare cell B, which could improve the comprehensive performance of the lithium-ion battery; although the introduction of this material may lead to the relative deterioration of the gas production performance, it cooperated with the ternary positive electrode material with a higher nickel content in the bare cell B to generally improve the comprehensive performance of the lithium-ion secondary battery.

It can be found from Examples 3 and 4 that a single crystal or single crystal-like ternary positive electrode material with a low nickel content could be further introduced into the bare cell B, which could improve the comprehensive performance of the lithium-ion battery, the gas production performance would be better while ensuring that the cyclic expansion was improved, and the lithium-ion battery had better comprehensive performance when the k value was in a suitable range.

To sum up, the present invention effectively overcomes various shortcomings in the prior art and has a high industrial utilization value.

The afore-mentioned examples merely illustrate the principles and efficacy of the present invention, rather than limiting the present invention. Anyone skilled in the art can modify or change the afore-mentioned examples without departing from the spirit and scope of the present invention. Therefore, all equivalent modifications or changes made by those of ordinary skills in the art without departing from the spirit and technical idea disclosed in the present invention should still be covered by the claims of the present invention.

The invention claimed is:

1. A lithium-ion secondary battery, comprising a bare battery cell accommodating cavity in which a bare battery cell group comprising one or more bare cells A and one or more bare cells B is arranged, wherein the bare cell A comprises a first positive electrode sheet comprising a first positive-electrode active material selected from a single crystal or single crystal-like low-nickel ternary positive electrode material A1, wherein single crystal-like ternary low-nickel electrode material comprises primary particles and secondary particles and volume distribution of secondary particles formed by agglomeration is 10% to 35%, the bare cell B comprises a second positive electrode sheet comprising a second positive-electrode active material and/or a third positive-electrode active material, the second positive-electrode active material is selected from a polycrystalline high-nickel ternary positive electrode material B1, and the third positive-electrode active material is selected from a polycrystalline low-nickel ternary positive electrode material B2; wherein mole fraction of low-nickel is greater than 0 and less than or equal to 0.65 and mole fraction of high nickel is greater than or equal to 0.7 and less than 1, wherein 100% SOC charged unit cell volume shrinkage rate of the single crystal or single crystal-like low-nickel ternary positive electrode material A1 is ≤3%;

and/or, the 100% SOC charged unit cell volume shrinkage rate of the polycrystalline high-nickel ternary positive electrode material B1 is ≥4%;

and/or, the 100% SOC charged unit cell volume shrinkage rate of the polycrystalline low-nickel ternary positive electrode material B2 is ≤3%.

2. The lithium-ion secondary battery according to claim 1, wherein the molecular formula of the single crystal or single crystal-like low-nickel ternary positive electrode material A1 is $LiNi_{x1}Co_{y1}Mn_{1-x1-y1}O_2$, wherein $0<x1\leq0.65$, $0<y1<0.35$, $0<1-x1-y1<0.35$.

3. The lithium-ion secondary battery according to claim 1, wherein the molecular formula of the single crystal or single crystal-like low-nickel ternary positive electrode material A1 is $LiNi_{x1}Co_{y1}Mn_{1-x1-y1}O_2$, wherein $0<x1\leq0.55$, $0<y1<0.45$, $0<1-x1-y1<0.45$.

4. The lithium-ion secondary battery according to claim 1, wherein the molecular formula of the polycrystalline high-nickel ternary positive electrode material B1 is $LiNi_{x2}Co_{y2}Mn_{1-x2-y2}O_2$, wherein $0.7\leq x2<1$, $0<y2<0.3$, $0<1-x2-y2<0.3$.

5. The lithium-ion secondary battery according to claim 1, wherein the molecular formula of the polycrystalline low-nickel ternary positive electrode material B2 is $LiNi_{x3}Co_{y3}Mn_{1-x3-y3}O_2$, wherein $0<x3\leq0.65$, $0<y3<0.35$, $0<1-x3-y3<0.35$.

6. The lithium-ion secondary battery according to claim 1, wherein the molecular formula of the polycrystalline low-nickel ternary positive electrode material B2 is $LiNi_{x3}Co_{y3}Mn_{1-x3-y3}O_2$, wherein $0<x3\leq0.55$, $0<y3<0.45$, $0<1-x3-y3<0.45$.

7. The lithium-ion secondary battery according to claim 1, wherein the bare cell B is distributed closer to the outside of the bare cell group than the bare cell A.

8. The lithium-ion secondary battery according to claim 1, wherein the bare cell A is distributed closer to the middle of the bare cell group than the bare cell B.

9. The lithium-ion secondary battery according to claim 1, wherein the second positive electrode sheet further comprises a fourth positive-electrode active material selected from a single crystal or single crystal-like low-nickel ternary positive electrode material A2, and the molecular formula of the single crystal or single crystal-like low-nickel ternary positive electrode material A2 is $LiNi_{x4}Co_{y4}Mn_{1-x4-y4}O_2$, wherein $0<x4\leq0.65$, $0<y4<0.35$, $0<1-x4-y4<0.35$.

10. The lithium-ion secondary battery according to claim 9, wherein 100% SOC charged unit cell volume shrinkage rate of the single crystal or single crystal-like low-nickel ternary positive electrode material A2 is ≤3%.

11. The lithium-ion secondary battery according to claim 1, wherein the second positive electrode sheet further comprises a fourth positive-electrode active material selected from a single crystal or single crystal-like low-nickel ternary positive electrode material A2, and the molecular formula of the single crystal or single crystal-like low-nickel ternary positive electrode material A2 is $LiNi_{x4}Co_{y4}Mn_{1-x4-y4}O_2$, wherein $0<x4\leq0.55$, $0<y4<0.45$, $0<1-x4-y4<0.45$.

12. The lithium-ion secondary battery according to claim 1, wherein in the lithium-ion secondary battery, a mass ratio k of the total mass of the single crystal positive-electrode active material to the total mass of the polycrystalline positive-electrode active material is 0.5-9.

13. The lithium-ion secondary battery according to claim 1, wherein a coating amount of a negative electrode in the bare cell A is ≤0.150 g/1540.25 mm^2.

14. A battery module comprising the lithium-ion secondary battery according to claim 1.

15. A battery pack comprising the battery module according to claim 14.

16. A powered device comprising the battery pack according to claim 15.

17. A powered device comprising the battery module according to claim 14.

18. A powered device comprising one or more selected from the lithium-ion secondary battery according to claim 1.

* * * * *